Patented July 11, 1972

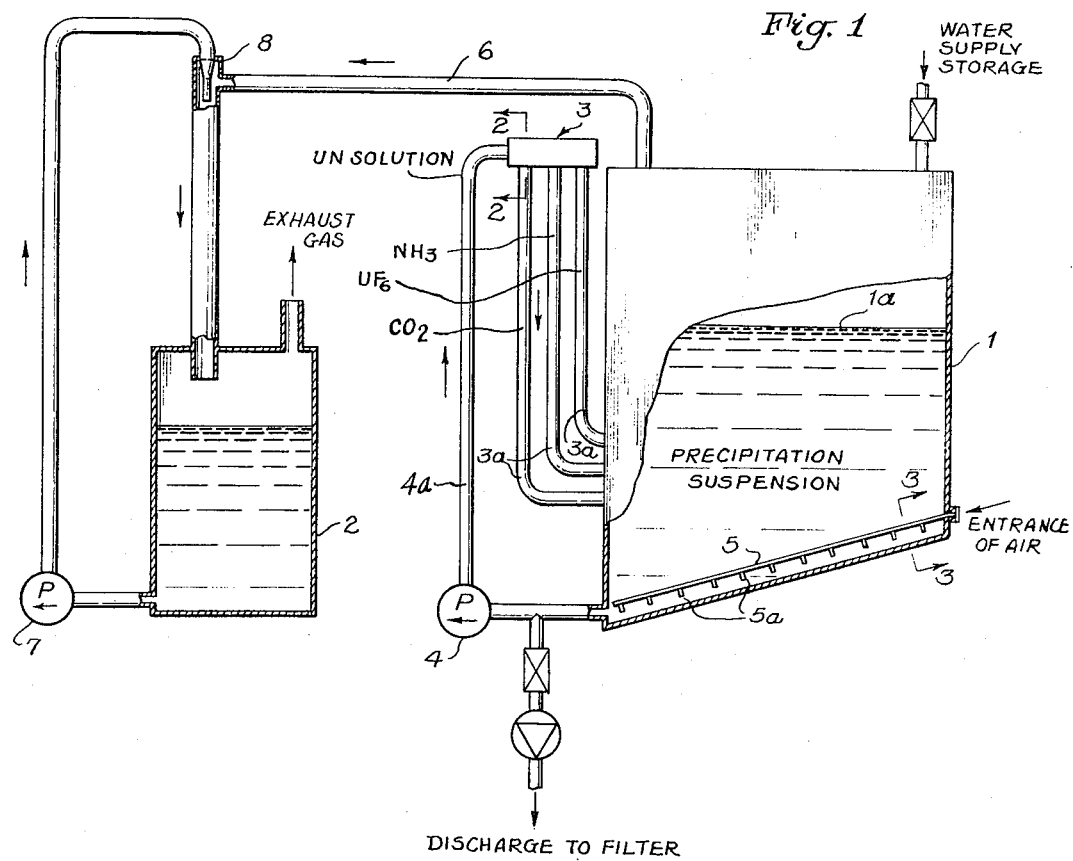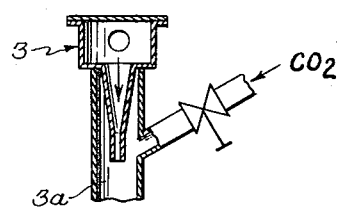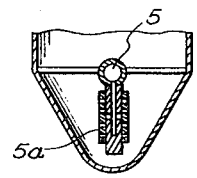

3,676,075
APPARATUS FOR SEPARATING URANIUM FROM AN AQUEOUS SOLUTION

Fritz Ploger, Kleinostheim, and Horst Vietzke, Grossauheim, Germany, assignors to Nukem Nuklear-Chemie und Metallurgie Gesellschaft m.b.H., Wolfgang, near Hanau am Main, Germany
Filed July 7, 1969, Ser. No. 839,435
Claims priority, application Germany, May 14, 1969, P 19 24 594.4
Int. Cl. B01j 1/00; C01g 43/00
U.S. Cl. 23—285                                   5 Claims

ABSTRACT OF THE DISCLOSURE

A uranium solution is cycled from a vessel through mixing nozzles mounted in precipitating tubes and back into the vessel, and the gases produced in the vessel are passed into a washing tank.

---

This invention relates to an apparatus for separating uranium from an aqueous solution.

When producing nuclear reactor material from U–235, the $UF_6$ is customarily carried for delivery in pressurized containers. In order to process further the $UF_6$, it is vaporized from the pressurized containers in a following vessel, which can be a separation or precipitation chamber. The uranium is precipitated from the aqueous solution either with an ammonium-alkali solution in the form of ammonium-uranate (ADU) or with $(NH_4)_2 CO_3$ in the form of a solution or the gaseous components $NH_3$ and $CO_2$ as ammonium uranyl carbonate (AUC). These separating or rather precipitation steps usually take place in heated boilers wherein the precipitation reagents are added by a simple supply system while the solution is stirred. When the precipitation reagents in aqueous systems are hard to dissolve gases, injector nozzles are often used which enhance the absorption.

When enriched uranium is processed, it is necessary to deviate from the usual compactly built reactor vessels and to use vessels satisfying nuclear safety requirements, the geometry of which could be distinctly disadvantageous with regard to the reactions to be performed in them. Flat containers with safe geometrical designs have the disadvantage that they are difficult to get into as compared with compact containers and are therefor difficult to clean.

The object of this invention is to produce an apparatus for separating uranium from an aqueous solution which avoids the aforesaid disadvantages.

In general, these objects are obtained by installing a system of mixing nozzles on the side of a vessel and from which nozzles precipitation tubes lead into a vessel beneath the liquid surface level of the solution in the vessel. A pump connected to the bottom of the vessel supplies the liquid to the nozzles for an excellent mixing of the entire contents of the vessel.

The means by which the objects of this invention are obtained are described more fully with reference to the accompanying schematic drawings in which:

FIG. 1 is a side view partially in cross-section of the apparatus;
FIG. 2 is a cross-sectional view taken on the line 2—2 of FIG. 1; and
FIG. 3 is a cross-sectional view taken on the line 3—3 of FIG. 1.

The apparatus essentially is composed of two parts, namely, the precipitation vessel 1 and a washer tank 2 connected to vessel 1. Safe geometrical designs are used for the dimensions for the vessel and tank. They are flat-sided containers of sufficient safety thickness.

Precipitation vessel 1 is a flat-sided vessel which has large heat exchange surfaces for being heated and cooled. It is connected to the mixing nozzles 3 via the pump 4. As well as $UF_6$, it is also possible to feed into the mixing nozzles 3 gaseous as well as liquid precipitation reagents.

The cross-sectional area of each mixing nozzle to the area of the precipitation tube 3a has a ratio ranging from 1:3 up to 1:5 in order to prevent the nozzles from being clogged while still obtaining an excellent mixing effect. One mixing nozzle is provided for each component metered and introduced into the precipitation vessel. The water 1a in vessel 1 is moved by pump 4 into the nozzles 3 from which individual precipitation tubes extend into the vessel 1 below the surface level of the solution in the vessel. In order to obtain a thorough mixing of either liquid or liquid with gas components in the tubes 3a, the tubes have a minimum length of at least 1 m.

The term "UN Solution" in the drawing refers to the liquid which is pumped by pump 4 through pipe 5a. This is the solution 1a from tank 1 from which the filtrate has been removed. This water still contains amounts of nonprecipitated uranium compounds.

In order to prevent the precipitation from settling into a sedimentation, an air pipe or gas supply tube 5 having downwardly directed nozzles 5a is mounted on the slanted bottom of the vessel 1.

The washer tank 2 is connected by a pipe 6 with vessel 1. Tank 2 is also a flat-sided container which can be cooled on its side surfaces. It is connected to a mixing pump 7 to force liquid into a mixing nozzle 8 mounted in pipe 6. An especial advantage of the mixing nozzles 3 and 8 in the tubes and pipes is obtained because the strong mixing effect always gives a good absorption of difficult to absorb gases. The apparatus is usable with good success in the absorption of radioactive aerosols and in the absorption of $NO_2$ and $CO_2$.

EXAMPLE 1

For the precipitation of approximately 130 kg. U as ammonium uranyl carbonate (AUC), 500 l. water was placed in vessel 1 and together with the washing water in tank 2 was mixed by the mixing nozzles 3 and 8.

When mixing $UF_6$, it is advantageous that the $UF_6$ is introduced via the mixing nozzle with the uppermost supply pipe because the F− content of the precipitation product is to be obtained in especially small sizes, for example, less than 500 p.p.m. F−. The $CO_2$ and $NH_3$ components were supplied by means of two further nozzles. The precipitation temperature was maintained at 60° C. After the precipitation had been completed at pH values between 8 and 9, the suspension was cooled to approximately 18° C. and discharged onto a filter.

EXAMPLE 2

Instead of precipitating uranium compound from $UF_6$, a highly concentrated solution of uranyl nitrate, approximately 400 g. U/l., was precipitated. As in Example 1, the uranium components were metered and supplied during the entire time extent of precipitation.

Having now described the means by which the objects of this invention are obtained,

We claim:
1. An apparatus for separating compounds from an aqueous solution comprising a precipitating vessel containing liquid mixing nozzle means composed of three separate nozzles positioned higher than the surface of liquid in said vessel means to supply liquid from the bottom of said vessel, a separate supply source for each of the reactants $UF_6$, $NH_3$ and $CO_2$, separate tube means to each of which one of said supply sources is connected leading from said nozzles to said vessel and connected to said vessel below the surface of the liquid therein for carrying $UF_6$, $NH_3$, and $CO_2$ solution respectively from said nozzle means to said vessel at different levels, the tube means carrying the $UF_6$ being at the highest level, washer tank means joined to said vessel for absorbing gases and aerosols coming from said vessel, and means to withdraw materials from the apparatus.

2. An apparatus as in claim 1, said mixing nozzle means comprising nozzles communicating with tubes in said tube means, with the cross-sectional area ratio of the nozzles to the tubes ranging from 1:3 to 1:5, and pump means for pumping liquid from said vessel to said nozzles at a pressure of at least 0.5 atmosphere.

3. An apparatus as in claim 2, said tubes having a length of at least 1 meter.

4. An apparatus as in claim 1, further comprising a pipe joining said washer tank means to said vessel, and mixing nozzle pipe means in said pipe for injecting liquid pumped from said tank means into said pipe.

5. An apparatus as in claim 4 in which the ratio of the diameter of the mixing nozzle pipe means to said pipe ranges from 1:5 to 1:6 and the liquid pressure is at least 1.5 atmospheres.

References Cited
UNITED STATES PATENTS

| | | | |
|---|---|---|---|
| 1,808,956 | 6/1931 | Ketterer | 261—36 X |
| 2,020,850 | 1/1935 | Myhren et al. | 261—76 |
| 2,582,317 | 1/1952 | Donohue | 23—285 |

JAMES H. TAYMAN, JR., Primary Examiner

U.S. Cl. X.R.

261—76, 36; 259—95, 96; 23—322, 333